(12) United States Patent
Dropps

(10) Patent No.: US 8,228,906 B1
(45) Date of Patent: Jul. 24, 2012

(54) METHOD AND SYSTEM FOR VIRTUAL LANE ASSIGNMENT

(75) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1338 days.

(21) Appl. No.: 11/859,964

(22) Filed: Sep. 24, 2007

(51) Int. Cl.
*H04L 12/28* (2006.01)

(52) U.S. Cl. ......... 370/356; 370/392; 370/397; 370/401

(58) Field of Classification Search ............... None
See application file for complete search history.

(56) References Cited

U.S. PATENT DOCUMENTS

| | | | | |
|---|---|---|---|---|
| 6,898,752 | B2 * | 5/2005 | Tucker | 714/752 |
| 7,307,996 | B2 * | 12/2007 | Forbes et al. | 370/401 |
| 7,680,054 | B1 * | 3/2010 | Acharya | 370/238 |
| 2002/0150106 | A1 * | 10/2002 | Kagan et al. | 370/395.6 |
| 2004/0022257 | A1 * | 2/2004 | Green et al. | 370/401 |
| 2007/0157064 | A1 * | 7/2007 | Falik et al. | 714/755 |

* cited by examiner

*Primary Examiner* — Melanie Jagannathan
(74) *Attorney, Agent, or Firm* — Klein, O'Neill & Singh, LLP

(57) ABSTRACT

Method and system for routing a network packet via a network switch is provided. The method includes receiving the network packet at the network switch; extracting a service level ("SL") field value, a source local identifier ("SLID") field value and a destination local identifier ("DLID") field value from the network packet; determining if a virtual lane ("VL") configuration mode is enabled; determining a VL based on one or more of the SLID field value, the DLID field value and a VL selection parameter, in addition to the SL field value, if the VL configuration mode is enabled; and routing the network packet using the determined VL value.

21 Claims, 5 Drawing Sheets

METHOD AND SYSTEM FOR VIRTUAL LANE ASSIGNMENT

TECHNICAL FIELD

The present invention relates to networks, and more particularly, to virtual lane assignment in networks.

RELATED ART

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

A network switch is typically a multi-port device where each port manages a point-to-point connection between itself and an attached system. Each port can be attached to a server, peripheral, input/output subsystem, bridge, hub, router, or another switch. The term network switch as used herein includes a Multi-Level switch that uses plural switching elements within a single switch chassis to route data packets.

In an Infiniband ("IB") switch when a packet is received, a service level ("SL") field is assigned by an application running on a subnet manager. The network condition can change, but the service level, typically does not change.

Virtual Lanes ("VL") are commonly used in IB switches. VLs are typically assigned per the IB standard. The SL field is used to identify a VL for a packet. Different applications may use the same SL to assign a VL. This may under utilize certain VLs and over utilize other VLs. Therefore, there is a need for better VL assignment.

SUMMARY OF THE INVENTION

In one embodiment, a method for routing a network packet via a network switch is provided. The method includes, receiving the network packet at the network switch; extracting a service level ("SL") field value, a source local identifier ("SLID") field value and a destination local identifier ("DLID") field value from the network packet; determining if a virtual lane ("VL") configuration mode is enabled; determining a VL based on one or more of the SLID field value, the DLID field value and a VL selection parameter, in addition to the SL field value, if the VL configuration mode is enabled; and routing the network packet using the determined VL value.

In another embodiment, a network switch for routing a network packet is provided. The network switch includes a receive port that receives the network packet and extracts a service level ("SL") field value, a SLID field value and a DLID field value; determines if a virtual lane ("VL") configuration mode is enabled; and determines a VL, based on one or more of the SLID field value, the DLID field value and a VL selection parameter, in addition to the SL field value, if the VL configuration mode is enabled.

In yet another embodiment, a network system for routing a network packet is provided. The system includes a first network device for sending the network packet; a second network device for receiving the network packet; and a network switch for routing the network packet, the network switch includes a receive port that receives the network packet and extracts a service level ("SL") field value, a SLID field value and a DLID field value; determines if a virtual lane ("VL") configuration mode is enabled; and determines a VL, based on one or more of the SLID field value, the DLID field value and a VL selection parameter, in addition to the SL field value, if the VL configuration mode is enabled.

This brief summary has been provided so that the nature of the invention may be understood quickly. A more complete understanding of the invention can be obtained by reference to the following detailed description of the various embodiments thereof concerning the attached drawings.

BRIEF DESCRIPTION OF THE DRAWINGS

The foregoing features and other features of the present invention will now be described with reference to the drawings of the various embodiments. In the drawings, the same components have the same reference numerals. The illustrated embodiments are intended to illustrate, but not to limit the invention. The drawings include the following Figures.

DETAILED DESCRIPTION

Definitions

Figure 1A:
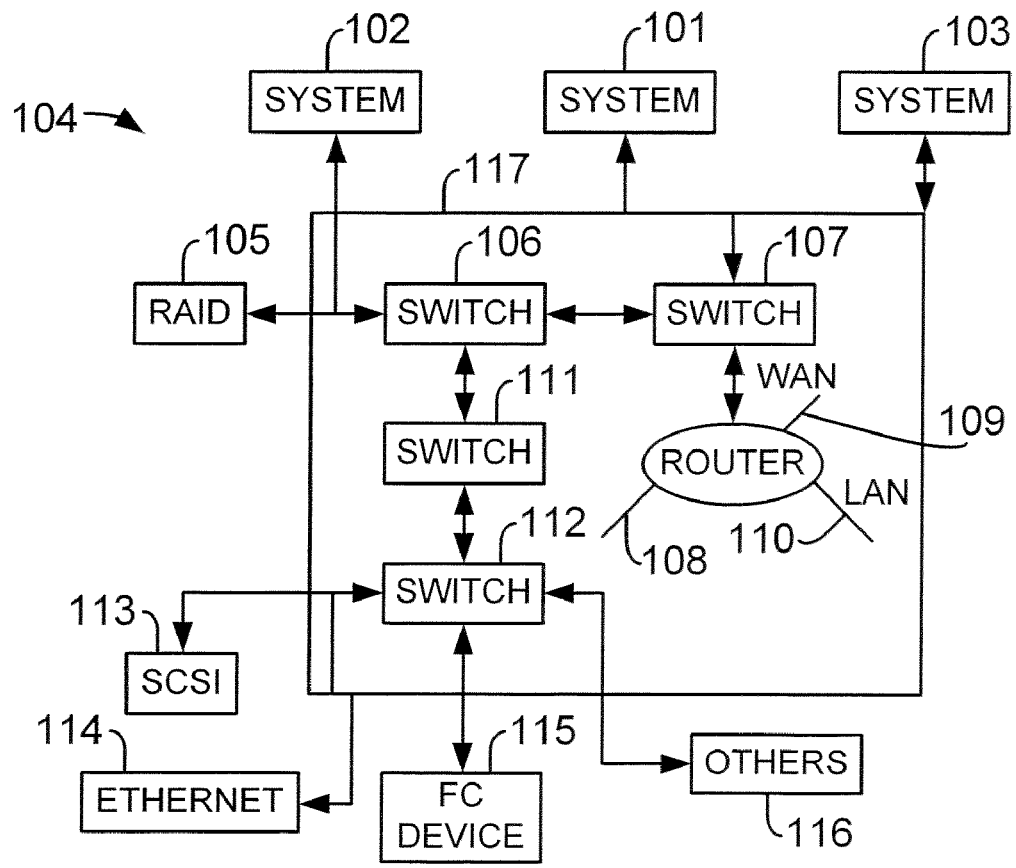
FIG. 1A shows a block diagram of a network system, according to one embodiment.

The following definitions are provided for convenience as they are typically (but not exclusively) used in IB network systems and in general networking environment, implementing the various adaptive aspects described herein.

"DLID" means a destination identifier, a field in an IB packet for identifying a local subnet packet destination.

"Multi Level Switch" means a network switch that includes a plurality of switch elements operationally coupled together.

"Packet" means a group of one or more network data word(s) for network communication.

"Routing Table" means a table that stores information for routing a packet.

"Service Level" (SL) as defined by the IB Specification means a value in a standard Local Route Header per the IB Standard that is used to identify a Virtual Lane for a packet. Each IB packet has a SL value, which is specified in a standard packet header. Per the standard IB specification, as a packet traverses through a fabric, the packet's SL determines which VL will be used for each link.

"SLID" means a source identifier in an IB packet for identifying a local subnet packet source.

"Switch" means a networked device that facilities network communication conforming to certain protocols/standards, for example, the IB protocol.

"Virtual Lane" (VL): VL is defined by Section 3.5.7 of the IB Specification and provides a mechanism for creating virtual links within a single physical link. A virtual lane represents a set of transmit and receive buffers in a port. All IB ports support VL15, which is reserved for subnet management. There are 15 other VLs (V10 to VL14) called data VLs. A data VL is used to send IB packet and a port supports at least one data VL (for example, VL0). The actual data VL that a port uses is configured by a subnet manager and is based on the service level field in an IB packet. The default is to use VL0 until the subnet manager determines the number of VLs supported by both ends of a link and programs the port using a SL to VL mapping table. Each port maintains an SL to VL mapping table. According to the IB Specification, a subnet manager based on a Service Level field in a packet assigns a VL.

To facilitate an understanding of the various embodiments, the general architecture and operation of a network system will be described. The specific architecture and operation of the various embodiments will then be described with reference to the general architecture of the network system.

IB is a switched fabric interconnect standard for servers, incorporated herein by reference in its entirety. IB technology is deployed for server clusters/enterprise data centers ranging from two to thousands of nodes. The IB standard is published by InfiniBand Trade Association, and is incorporated herein by reference in its entirety.

An IB switch is typically a multi-port device. Physical links (optical or copper) connect each port in a switch to another IB switch or an end device (for example, Target Channel Adapter (TCA) or a Host Channel Adapter (HCA)).

FIG. 1A shows a block diagram of a network system 104. System 104 includes a switching fabric 117, which includes plural network switches 106, 107, 111 and 112 for moving network packets. Fabric 117 also includes a router 108 that is coupled to a wide area network 109 and local area network 110.

Switch 106 is operationally coupled to storage system 105 (for example, a RAID (redundant array of inexpensive disks) system) and to system 102, while system 101 and 103 may be operationally coupled to switch 107.

Switch 112 may be coupled to a small computer system interface ("SCSI") SCSI port 113 that is coupled to SCSI based devices (not shown). Switch 112 may also be coupled to an Ethernet port 114, Fibre Channel device (s) 115 and other device(s) 116.

Systems 101-103 may be computing systems that typically include several functional components. These components may include a central processing unit (CPU), main memory, input/output ("I/O") devices, and streaming storage devices (for example, tape drives). In typical computing systems 101-103, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system or host computing system.

Figure 1B:
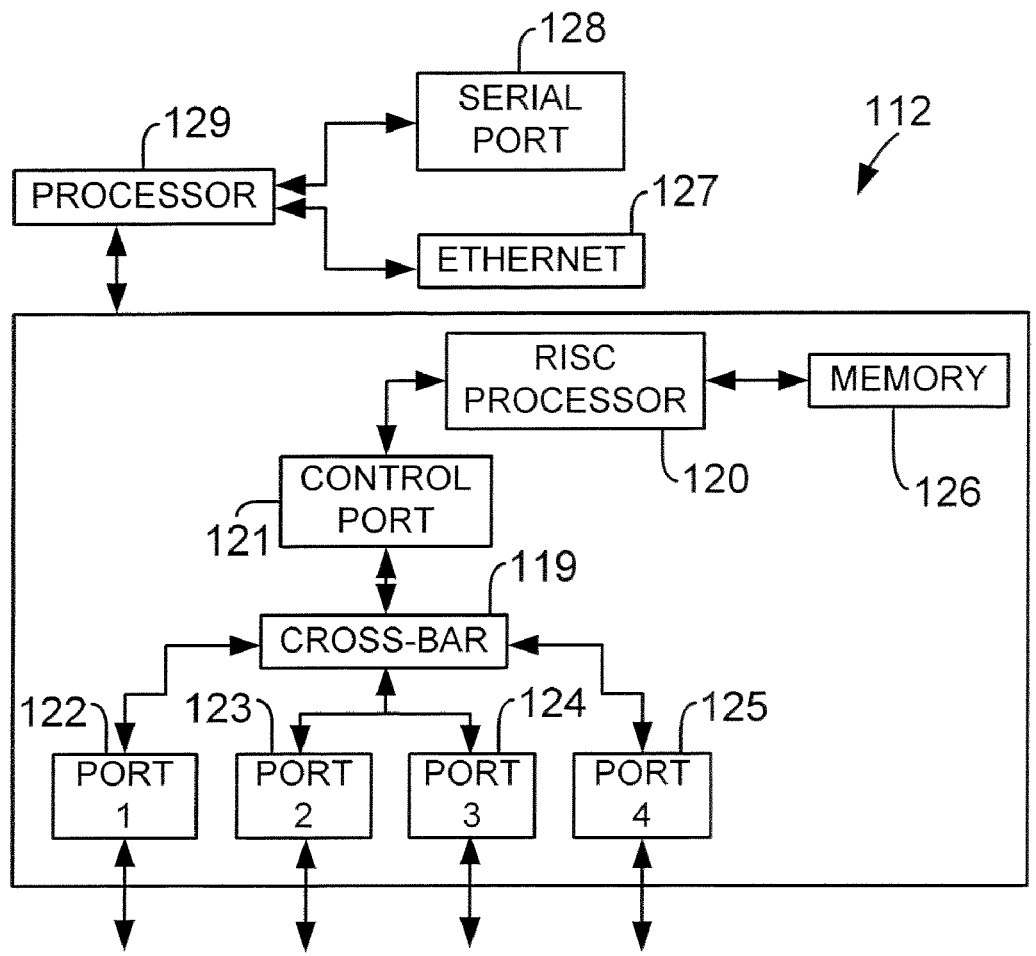
FIG. 1B shows a block diagram of a switch in a network system, according to one embodiment.

FIG. 1B shows a block diagram of switch 112 that includes a processor 120, which is operationally coupled to plural ports 122, 123, 124 and 125 via a control port 121, and crossbar 119. In one embodiment, processor 120 may be a reduced instruction set computer (RISC) type microprocessor.

Switch 112 may be coupled to an external processor 129 that is coupled to an Ethernet port 127 and serial port 128. In one aspect of the present invention, processor 129 may be a part of a computing system (for example, 101-103). An administrator may use processor 129 to configure switch 112.

Figure 2A:
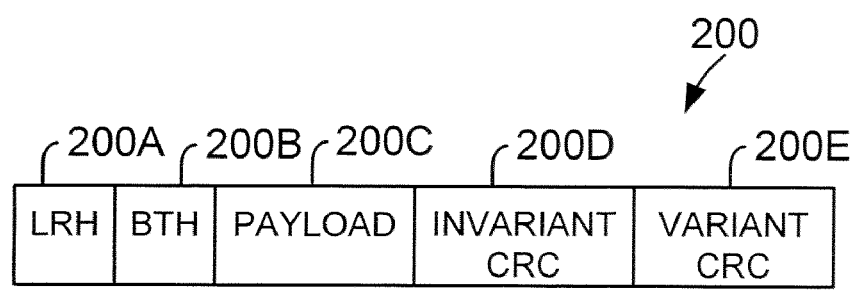
FIG. 2A shows a block diagram of a network packet structure used according to one embodiment.

FIG. 2A provides an example of packet structure that may be used in the various embodiments described herein. Packet 200 includes a local route header 200A, a base transport header (BTH) 200B, packet payload 200C, invariant cyclic redundancy code (CRC), and variant CRC 200E. Packet structure 200 is described in Infiniband Architecture Specification, Volume 1, Chapter 6, titled "Data Packet Format", incorporated herein by reference in its entirety.

Figure 2B:
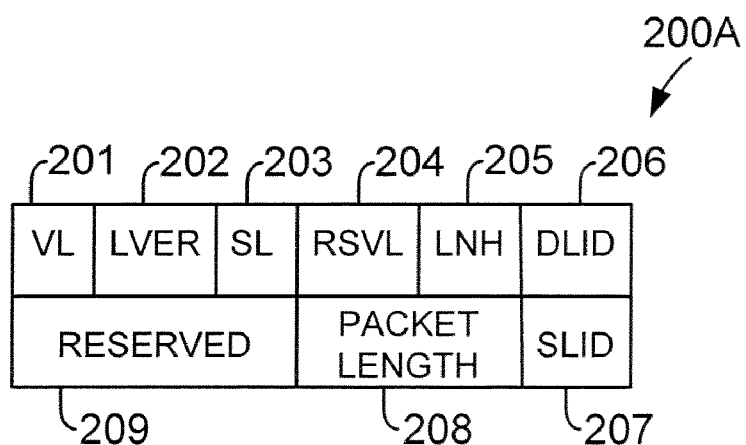
FIG. 2B shows a block diagram of a local route header in the packet structure of FIG. 2A, used according to one embodiment.

FIG. 2B shows a block diagram of a local route header (LRH) 200A, with plural fields. The fields may be used for routing network packets in an IB based network environment. LRH 200A includes a virtual lane (VL) field 201 that identifies which receive buffer and flow control credits should be used for processing received packet, and link version (Lver) field 202 specifies the version of the LRH packet 200A. LRH 200A also includes service level (SL) field 203, a standard field that is used identify a VL for a packet.

LRH 200 further includes a Link next header (LNH) field 205, which specifies what header follows LRH 200A. Field 209 is a reserved field.

LRH 200A also includes a DLID field 206 that specifies the local destination to which switch 112 delivers the packet and SLID field 207 that indicates the source of a network packet. Packet length field 208 specifies the number of words contained in a packet.

Figure 3:
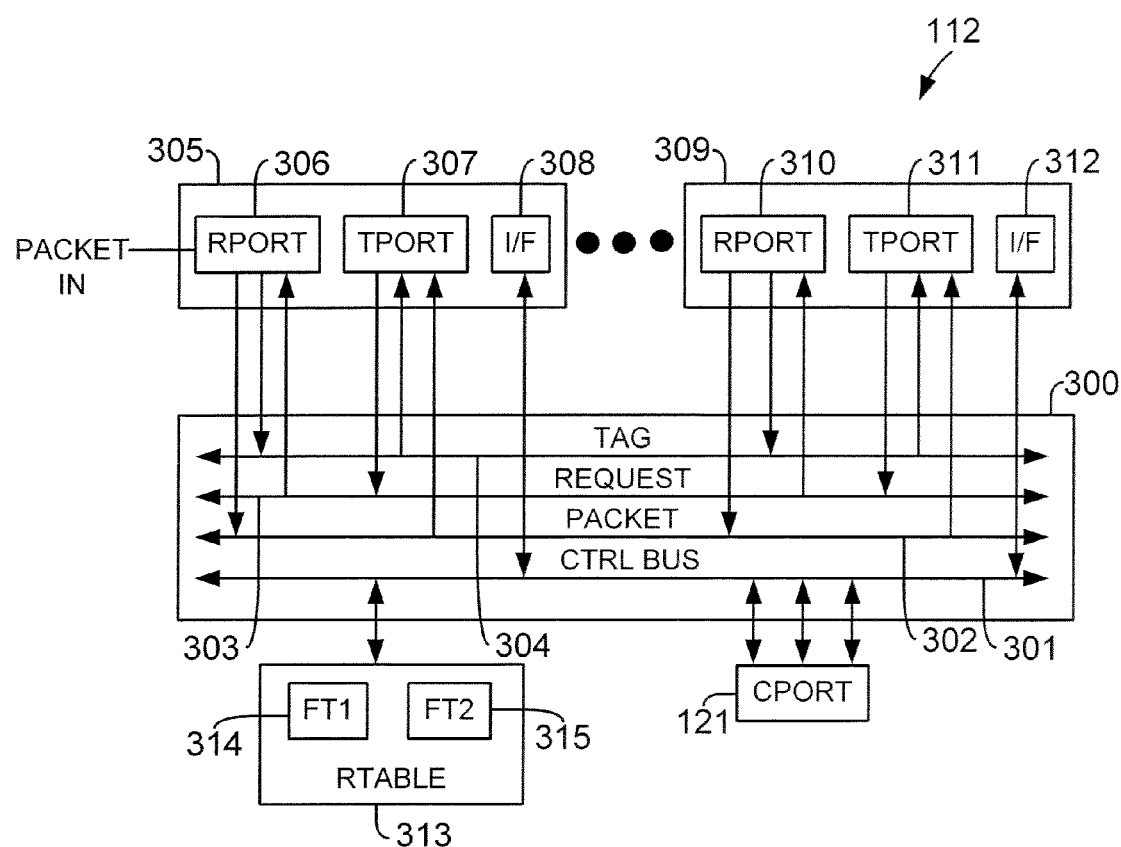
FIG. 3 shows another block diagram of a switch according to one embodiment.

FIG. 3 shows a block diagram of a switch 112 (or switch element 112) with a switch fabric 300. Switch fabric 300 is operationally coupled to CPORT 121 and plural ports 305 and 309. It is noteworthy that ports 305 and 309 are similar to ports 122-125.

Switch fabric 300 includes a packet data crossbar 302, packet request crossbar 303 and packet tag crossbar 304 and a control bus 301.

Packet data crossbar 302 connects receive ports (306, 310) and transmit ports (307,311), and can concurrently transmit plural packets.

Packet Tag crossbar 303 is used to move plural packet tags from receive ports (306, 310) to transmit ports (307, 311), as described below.

Packet request crossbar 303 is used by transmit port (307, 311) to request a particular packet from a receive buffer.

Routing table (RTABLE) 313 is used to map DLID from a LRH 200A to one or more output ports. Routing table 313 includes forwarding tables 314 and 315, which are look up tables (LUTs) that service ports 305 and 309, respectively.

Interface (I/F) 308 and 312 provide input/output interface to switch 112.

Switch 112 may be implemented as a switch element of a single CMOS ASIC (application specific integrated circuit), and for this reason the term "switch", "switch element" and ASIC are used interchangeably to refer to the various embodiments in this specification.

For illustration purposes only, in FIG. 3, all ports coupled to end devices are on one side of ASIC 112. However, the ports may be located on any side of ASIC 100. This does not imply any difference in port or ASIC design. Actual physical layout of the ports depends on the physical layout of the ASIC.

Figure 3A:
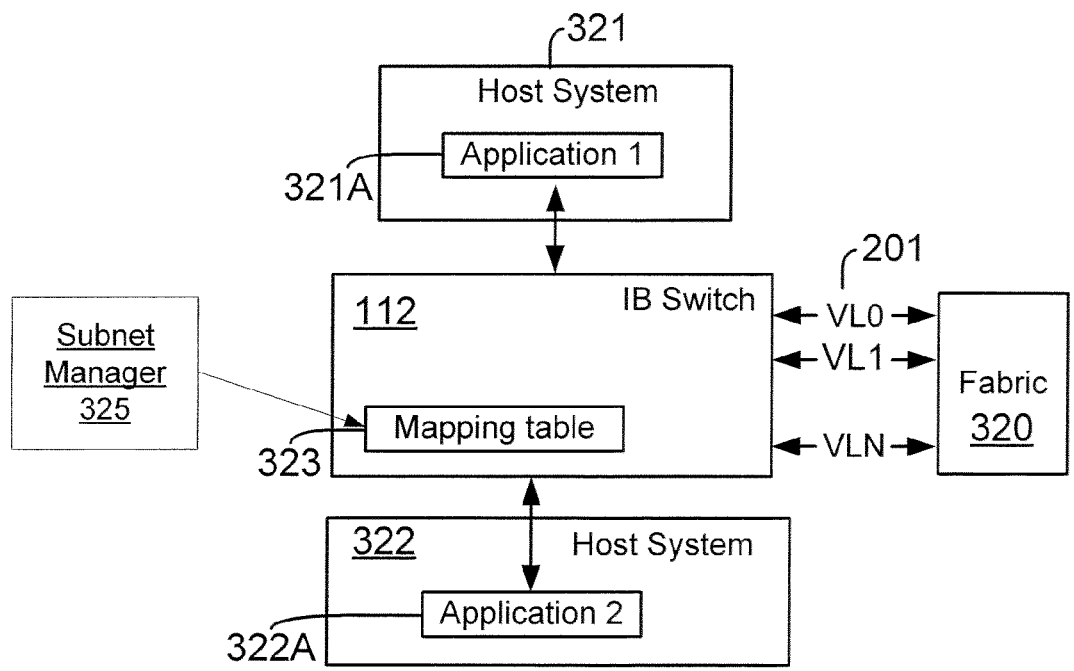
FIG. 3A shows a block diagram of a network switch with applications for setting virtual lanes, according to one embodiment.

FIG. 3A shows another block diagram for switch 112, according to one embodiment. Plural VLs (VL0, VL1 to VLn) 201 are used to separate flow control for network packets routed to/from Fabric 320.

Subnet manager software 325 executed by a host system or other device is used to configure switch 112. Application 321A that runs on Host System 321 is used to set the SL field for packets that arrive at a receive port of switch 112. Switch 112 performs a look up in mapping table 23 to map the set SL to a corresponding VL, for example VL0 201.

Similarly, application 322A executed within Host System 322 assigns a SL for routing an incoming packet. If the SL assigned by application 32A is the same as that set by application 321A, then the packets are assigned to the same VL, in this example, VL0. Therefore, VL0 is used to route packets from both applications even though other VL's (for example, VL1, VL2, VLN) may have credit available for routing packets. This results in over utilization of VL0 and under utilization of other VL's, which may lead to performance degradation. Although, VL0, VL1, VL2 and VLN are graphically shown as separate lines for clarity reasons, they actually share the same physical link while maintaining independent buffer-to-buffer flow control.

According to one embodiment, switch 112 re-maps VL based on other parameters, in addition to the SL mapping assigned by the Subnet Manager 325, to efficiently assign VLs. This reduces under-utilization and over-utilization of VLs.

Figure 4A:
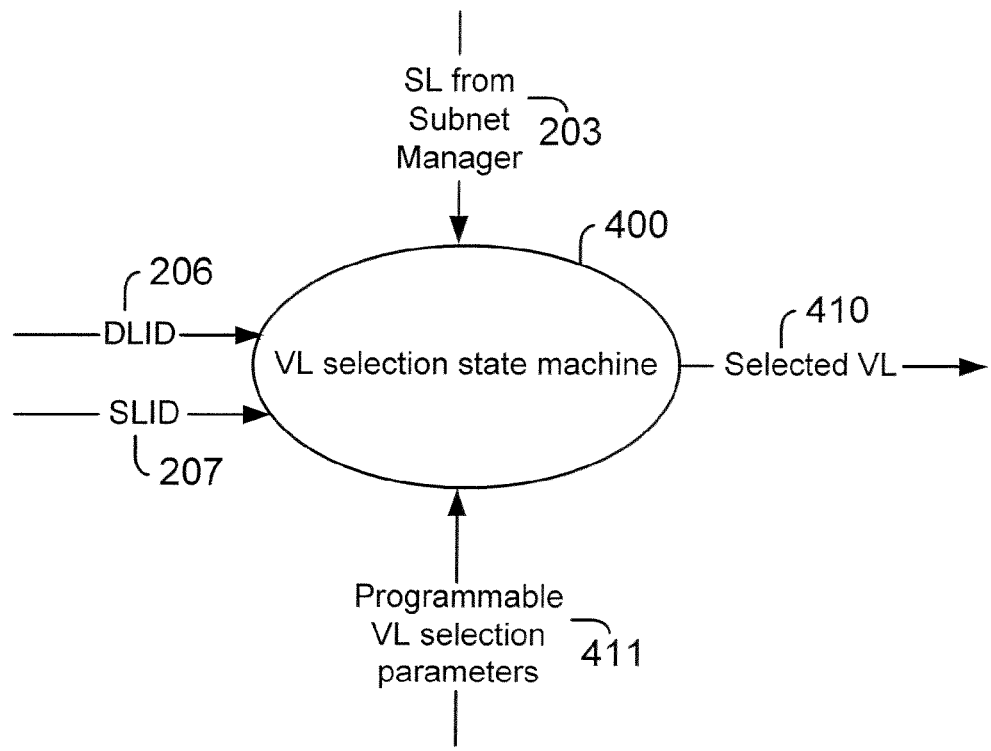
FIG. 4A shows a state machine for setting virtual lanes, according to one embodiment.

FIG. 4A shows a VL selection state machine, according to one embodiment. State machine 400 may be implemented in hardware, software or a combination thereof. State machine 400 may be located in a receive port or any other segment of switch 112

In one example, RPORT 306 maintains a state machine 400 that is used to assign a VL for routing a packet. When a packet arrives at the receive port of switch 112, RPORT 306 parses the packet and extracts local route header 201A.

SLID 207 and DLID 206 from header 201A are input to state machine 400. Other inputs to state machine 400 include SL 203 from the packet header and other programmable VL selection parameters 411. A user via an external application may specify parameters 411.

State machine 400 uses the plural inputs and generates a VL 410 for the received packet. For example, two packets might arrive with the same SL value (SL=2) but different DLIDs (DLID1=5, DLID2=7). Using only SL mapping would indicate that both packets should be assigned to VL0. In this example, the state machine 400 may assign the packet with DLID=5 to VL0 and the packet with DLID 7 to VL4.

According to one embodiment, state machine 400 uses a modified hamming code to select between the SL mapped VL and an alternative VL It is noteworthy that the state machine implementation may not be construed as a limitation for generating a VL, other hardware mechanisms like a look up table may be used to assign VLs. State machine 400 replaces the standard VL (which is based on a table look up using the SL field) with the generated VL 410 and routes the packet as described below with respect to FIG. 4B.

Figure 4B:
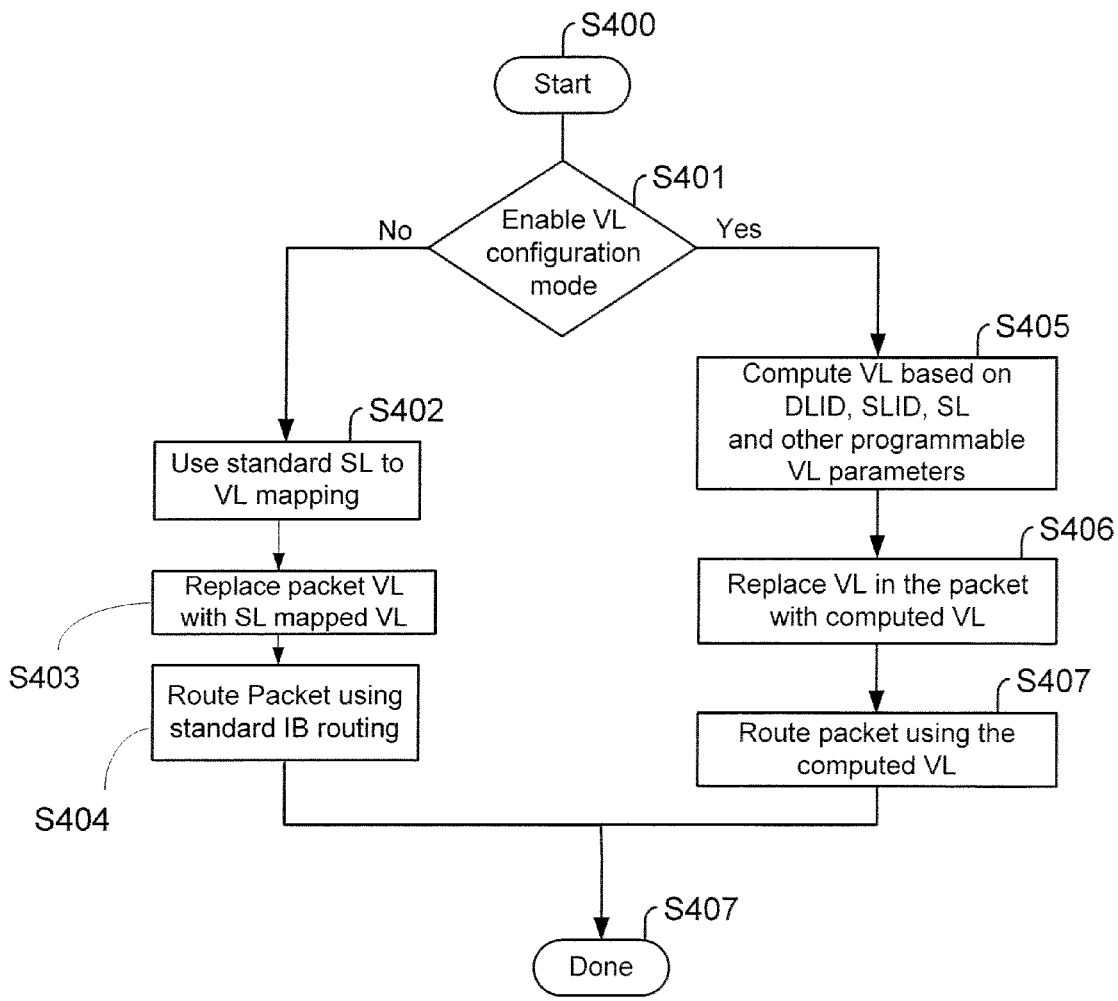
FIG. 4B shows a process flow chart for routing a packet in an IB switch, according to one embodiment.

FIG. 4B shows a process flow diagram for routing a network packet in an IB switch, according to one embodiment. The process starts in step S400, when a packet arrives at a receive port, for example, RPORT 306.

In step S401, RPORT 306 determines if a VL configuration mode is enabled. Setting a control bit in a control register that is accessible by a processor 120 may enable this mode. In one embodiment, the control register may be located in control port 121.

In step S402, if configuration mode is not enabled in step S401, then standard mapping table 323 is used to assign the packet to a VL based on a table look up indexed by the SL field.

In step S403, RPORT 306 replaces the VL in the received packet with the VL mapped in step S402.

In step S404, the packet is routed using the standard mapped VL.

In step S405, if configuration mode is enabled in step S401, state machine 400 computes a VL based on SLID 207, DLID 206, SL 203 and other VL selection parameters 411.

In step S406, RPORT 306 replaces the VL in the received packet with the VL computed in step S405.

In step S407, the packet is transmitted from a transmit port (for example, TPORT 307) using the computed VL.

According to one embodiment, since VLs are selected based on various parameters, rather than simply the SL field, the VLs can be used efficiently. This improves overall performance and throughput of the network system.

Although the present invention has been described with reference to specific embodiments, these embodiments are illustrative only and not limiting. Many other applications and embodiments of the present invention will be apparent in light of this disclosure and the following claims.

What is claimed is:

1. A method for routing a network packet via a network switch, comprising:
   receiving the network packet at the network switch; extracting a service level ("SL") field value, a source local identifier ("SLID") field value and a destination local identifier CDLID") field value from the network packet;
   determining if a virtual lane ("VL") configuration mode is enabled by determining if a control bit is set;
   determining a VL using one or more of the extracted SLID field value, the extracted DLID field value and a VL selection parameter, in addition to the SL field value, if the VL configuration mode is enabled; and routing the network packet using the determined VL value.

2. The method of claim 1, further comprising:
   assigning a VL for routing the network packet based on the SL field value, if the VL configuration mode is not enabled.

3. The method of claim 1, wherein the step of determining a VL further comprises inputting the SLID field value, the DLID field value, the SL field value and the VL selection parameter to a state machine.

4. The method of claim 3, wherein the VL selection parameter is programmed in a register accessible to a microprocessor.

5. The method of claim 1, wherein a register setting enables the VL configuration mode.

6. The method of claim 3, wherein the state machine is implemented in hardware, software or a combination thereof and the state machine uses a hamming code for VL assignment.

7. The method of claim 1, wherein the network switch is an InfiniBand switch.

8. A network switch for routing a network packet, comprising: a receive port that receives the network packet and extracts a service level ("SL") field value, a SLID field value and a DLID field value; determines if a virtual lane ("VL") configuration mode is enabled by determining if a control bit is set; and determines a VL, using one or more of the extracted SLID field value, the extracted DLID field value and a VL selection parameter, in addition to the SL field value, if the VL configuration mode is enabled.

9. The network switch of claim 8, wherein a state machine in the receive port computes the VL based on one or more of the SLID field value, the DLID field value and the VL selection parameter, in addition to the SL field value.

10. The network switch of claim 8, wherein the VL selection parameter is programmed in a register accessible to a microprocessor.

11. The network switch of claim 8, wherein setting a register bit enables the VL configuration mode.

12. The network switch of claim 8, wherein the SL field value is used to assign a VL, if the VL configuration mode is not enabled.

13. The network switch of claim 9, wherein the state machine is implemented in hardware, software or a combination thereof and the state machine uses a hamming code for VL assignment.

14. The network switch of claim 8, wherein the network switch operates in an InfiniBand network.

15. A network system for routing a network packet, comprising:
    a first network device for sending the network packet; a second network device for receiving the network packet; and a network switch for routing the network packet, where the network switch includes a receive port that receives the network packet and extracts a service level ("SL") field value, a SLID field value and a DLID field value; determines if a virtual lane ("VL") configuration mode is enabled by determining if a control bit is set; and determines a VL, using one or more of the extracted SLID field value, the extracted DLID field value and a VL selection parameter, in addition to the SL field value, if the VL configuration mode is enabled.

16. The network system of claim 15, wherein a state machine in the receive port computes the VL based on one or more of the SLID field value, the DLID field value and the VL selection parameter, in addition to the SL field value.

17. The network system of claim 15, wherein the VL selection parameter is programmed in a register accessible to a microprocessor.

18. The network system of claim 15, wherein setting a register bit enables the VL configuration mode.

19. The network system of claim 15, wherein the SL field value is used to assign a VL, if the VL configuration mode is not enabled.

20. The network system of claim 16, wherein the state machine is implemented in hardware, software or a combination thereof and the state machine uses a hamming code for VL assignment.

21. The network system of claim 15, wherein the network switch operates in an InfiniBand network.

* * * * *